(12) United States Patent  (10) Patent No.: US 8,414,460 B2
Todokoro  (45) Date of Patent: Apr. 9, 2013

(54) CONNECTOR FOR JUNGLE GYM AND JUNGLE GYM USING SAME

(75) Inventor: Shinji Todokoro, Tokyo (JP)

(73) Assignee: Agatsuma Co., Ltd., Tokyo (JP)

( * ) Notice: Subject to any disclaimer, the term of this patent is extended or adjusted under 35 U.S.C. 154(b) by 354 days.

(21) Appl. No.: 12/785,799

(22) Filed: May 24, 2010

(65) Prior Publication Data
US 2010/0304935 A1 Dec. 2, 2010

(30) Foreign Application Priority Data

May 29, 2009 (JP) ............................. 2009-003578 U

(51) Int. Cl.
*A63B 21/00* (2006.01)

(52) U.S. Cl. ................................ 482/35; 482/23; 482/41
(58) Field of Classification Search ................... 482/23, 482/35, 33, 34, 36, 38, 41
See application file for complete search history.

(56) References Cited

U.S. PATENT DOCUMENTS

| 4,247,216 A * | 1/1981 | Pansini | 403/109.3 |
| 6,413,004 B1 * | 7/2002 | Lin | 403/176 |
| 2002/0064420 A1 * | 5/2002 | Lin | 403/217 |

* cited by examiner

*Primary Examiner* — Jerome W Donnelly
(74) *Attorney, Agent, or Firm* — The Marbury Law Group, PLLC

(57) ABSTRACT

To provide a connector for a jungle gym facilitating installation/removal of a tube and a connector and attaining a strong connection, and a jungle gym configured by the tubes connected thereby, the jungle gym comprises a plurality of tubes 2 and a connector for a jungle gym 1, the jungle gym connector 1 includes at least three connector arms 12 which protrude from a base portion 11 for being inserted into the tube 2, the connector arms 12 are disposed to intersect each other at right angles, the connector arm 12 includes at least one pair of cutout portions portion 14 which is formed as a flexible portion 13 which is elastically deformable to deflect by pressing force, and a locking projection 15 is formed at a center of the flexible portion 13 for being fitted into a locking hole 20 of the tube 2.

21 Claims, 6 Drawing Sheets

CONNECTOR FOR JUNGLE GYM AND JUNGLE GYM USING SAME

CROSS-REFERENCE TO RELATED APPLICATIONS

This application is based upon and claims the benefit of priority under 35 USC 119 of Japanese Utility model Application No. 2009-003578 filed on May 29, 2009, the entire contents of which, including the description, claims, drawings, and abstract, is incorporated herein by reference.

BACKGROUND OF THE INVENTION

Field of the Art

The invention relates to a configuration of a connector for connecting tubes of an assembly type jungle gym for children and a configuration of the jungle gym using the connector.

Conventionally, many types of assembling jungle gyms for children have been sold. A jungle gym is generally made up of tubes made of resin or paper and exclusive connectors and is built up by connecting the tubes by the connectors. The tubes are formed to have a length varying approximately from 30 to 40 cm and a diameter ranging approximately from 3 to 4 cm.

The connectors include a variety of connection types. For example, there is a three-branch connector for use in connecting the tubes at a corner. There is also a four-branch connector for use in connecting the tubes in between. Further, a five-branch connector and a six-branch connector are also provided. The jungle gym can be built up in any shape as desired by connecting the tubes together in every direction.

In these connectors, an outside diameter of a cylindrical connecting arm is formed slightly smaller than an inside diameter of the tubes. By the configuration, the connecting arms provided on the connector can be fitted into the tubes to thereby permit the tubes to be connected together via the connector. In this way, the jungle gym can be constructed in a variety of shapes.

However, in the connecting configuration of arm the jungle gym as described above, when the tubes are connected together solidly, the connecting arm and the tube are necessary to be fitted together closely. For this reason, there is caused a problem that the tubes are difficult to be assembled into or out of the connectors. Although making connections between the connectors and the tubes loose facilitates the attachment and detachment of the tubes to and from the connectors, it weakens a connecting strength between the connectors and the tubes.

There have been made many proposals on the connecting structure between the connectors and the tubes. For example, a connector for a jungle gym was proposed in Japanese Examined Utility Model Application No. 05 (1993)-22198. A connector includes an arm whose outer circumferential surface has been formed flared so as to be provided with an expanded diameter between the distal end and the proximal portion of the arm. The diameter expanding portion is formed so that the outside diameter thereof is formed gradually expanding from a distal end toward a proximal portion so as to be slightly larger in diameter than an inside diameter of a paper tube. Further, the outer diameter of the arm is formed smaller than a maximum diameter at a portion lying just before the proximal portion. Then, the proposed connector for the jungle gym has at least one expanded diameter portion in an intermediate position of the connecting arm.

In addition, Japanese Unexamined Patent Publication No. 07 (1995)-39604 proposes a connector for a jungle gym in which connecting shafts which extend laterally from a proximal portion, so that two flat plates intersect each other at right angles to thereby form a cruciform section.

In the jungle gym connector described in the Japanese Examined Utility Model Application No. 05-22198, by an elastic contraction of the fitted paper tube, the inside diameter of the paper tube is smaller than the maximum diameter of expanded portion at the proximal portion side the expanded portion of the connecting arm. By that elastic contraction effect, the tube can be prevented from slipping off arm towards the distal end of the connecting arm. Since the distal end of the connecting arm is relatively small in diameter, the connecting arm can be inserted into the paper tube in a smoother fashion compared to the conventional products. However, a removal of the connector is difficult since large force is required and the paper tube may possibly be damaged while being removed. In addition, the connector is designed for use in connecting the tubes made of materials such as paper having an elastic contracting property, and hence, there is caused a problem that the connector can not be applied to resin tubes.

Additionally, in the connector described in Japanese Unexamined Patent Publication No. 07-39604, since the connecting portion has the cruciform section, a bearing surface area between the connecting portion and the inner surface of the tube is smaller than that, provided by the cylindrical connector arm, and hence, attachment and detachment of the connector is relatively easy. However, this connector is designed mainly for mass production, and it does not have both ease of attachment/detachment and a sufficient connecting strength.

SUMMARY OF THE INVENTION

The invention has been made in view of the problem inherent in the related art and an object thereof is to provide a connector for a jungle gym which facilitates easy attachment/detachment of tubes to/from a connector and attains a strong connection therebetween, and a jungle gym having superior safety characteristics which is constructed by connecting a plurality of tubes by the connector.

According to a preferred aspect of the invention, a connector for a jungle gym of the present invention is a connector for use for the jungle gym which is constructed by connecting a plurality of tubes, comprising at least three cylindrical connector arms which are provided to protrude from a base portion so as to inserted into the tubes, wherein the three connector arms are disposed so as to intersect each other at right angles and each has on at least one location thereof one pair of cutout portions which is parallel to an axis direction of the connector arm, wherein a portion between the cutout portions is formed into a flexible portion which can be elastically deformed so as to be deflected inward by pressing force from outside=; and wherein a locking projection is formed substantially at a center of the flexible portion so as to be fitted in a locking hole in the tube.

The cutout portion of the present invention is made up of two linear cutout portions in the jungle gym connector and the flexible portion is connected to the cylindrical connector arm at two portions of a proximal side and a distal side of the connector arm.

A jungle gym of the present invention comprises:

a plurality of tubes which are all formed to a predetermined length;

the jungle gym connector to which the tubes are detachably attached;

a pliers-type removal tool which includes a clamped projection in an inside of each jaw portion formed so as to be inserted into the locking hole when the jaw portion is closed.

A jungle gym of another aspect of the invention is made up of a plurality of tubes and a plurality of jungle gym connectors, and the plurality of tubes may include a plurality of linearly cylindrical tubes formed to the same length.

In addition, the each tube of the jungle gym of the present invention includes four locking holes in proximity to both ends of the tube. The four locking holes provided in proximity to both the ends of the tube are formed so as to pass through the tube from inside to outside in four directions which are at right angle to each other. In addition, the locking holes are disposed in such a manner that a line passing through a center of the two locking holes disposed at the opposite ends of the tube is oriented to be parallel to the center axis of the tube.

In addition, each jungle gym connector of the jungle gym of the present invention includes a plurality of cylindrical connector arms. These connector arms are disposed in three in which center axis of the connector arms intersect each other at right angles. Each of the connector arms of the jungle gym connector is formed into a cylindrical shape having an outside diameter which enables the connector arm to be inserted into the tube. Further, each connector arm includes a flexible portion formed by two linear cutout portions which are parallel to an axis direction of the connector arms therebetween so as to be deformable. Additionally, each connector arm has a locking projection to be inserted into the locking hole in the tube at substantially a center of the flexible portion which projects outward from a surface of the connector arm.

The locking projection of the jungle gym connector of the jungle gym of the present invention may include at its distal end an inclined portion at its distal end which is formed by a proximal portion side being caused to protrude largely from a surface of the connector arm to reduce to which a plurality of the connector arms are connected and the degree of projection is lower at a distal end side of the each connector arm.

The jungle gym connector of the jungle gym of the present invention comprises a plurality of jungle gym connectors having three connector arms which are disposed so as to intersect each other at right angles, a plurality of jungle gym connectors having four connector arms which are disposed so as to intersect each other at right angles, and a plurality of jungle gym connectors having five connector arms which are disposed so as to intersect each other at right angles.

Additionally, the jungle gym connector of the jungle gym of the present invention may further include a plurality of jungle gym connectors six connector arms which are disposed so as to intersect each other at right angles.

It is preferable that two flexible portions are formed on each connector arm in the jungle gym of the present invention, that the two flexible portions are provided in symmetrical positions with respect to a center axis of the cylindrical connector arm, and that a line connecting the two flexible portions is made parallel to a center axis of another connector arm of the connector for the jungle gym.

The tubes and the jungle gym connector of the jungle gym of the present invention are made of a synthetic resin.

According to the present invention described above, there can be provided the jungle gym which is safe due to being made up of the jungle gym connector and the tubes that are connected together by the connector, the connector facilitating the attachment of the jungle gym connector to the tube and enabling the strong and firm connection therebetween by forming the pair of cutout portions to thereby form the elastically deformable flexible portion and by providing the locking projections at substantially the center of the flexible portion so as to be fitted into the locking hole in the tube and the tubes which are connected together by the jungle gym connector.

In addition, there can be provided the jungle gym connector which has a least fear that the connector is not restored even after repetition of attachment and detachment of the connector to and from the tubes and which has a superior durability due to the flexible portion which is formed by the two linear cutout portions being connected to the cylindrical connector arm at the two portions, that is, at the proximal side and at the distal side at both the ends.

The jungle gym can be disassembled with ease using the pliers-type removal tool having the clamping projection in the inside of the jaw portion at each jaw which is formed so as to be inserted into the locking hole in the tube when the jaw portion of the removal tool is closed.

A player can build up with ease the jungle gym in a well-balanced fashion by connecting the plurality of tubes in every direction via the jungle gym connector, since the four locking holes provided at each of the ends of the tube are formed to pass through the tube in the four directions which are at right angles to each other and are disposed in such a manner that the line connecting the center of the locking holes disposed at the one end and the center of the locking holes at the other end of the tube is oriented to be parallel to the center axis of the tube.

The jungle gym connector and the tube can be joined together more easily by providing the inclined portion on the locking projections of the jungle gym connector which is formed by making the protruding amount at the distal side of the connector arm smaller than that at the proximal portion side.

The jungle gym can be built up into the predetermined shape by including the jungle gym connector having the three to five connector arms. Additionally, the jungle gym can be built up into a more complicated and bigger configuration by including the jungle gym connector having the six connector arms.

By providing the two flexible portions on each connector arm and arranging the two flexible portions in the symmetrical positions with respect to the center axis of the cylindrical connector arm, the jungle gym connector can be attached to the tube with ease with a load uniformly distributed. Further, the jungle gym connector can be connected to the tube more securely.

In addition, by forming the tube and the jungle gym connector of the synthetic resin, the jungle gym can be provided which is light in weight, easy to handle, and inexpensive in cost.

DETAILED DESCRIPTION OF THE PREFERRED EMBODIMENT

Figure 1:
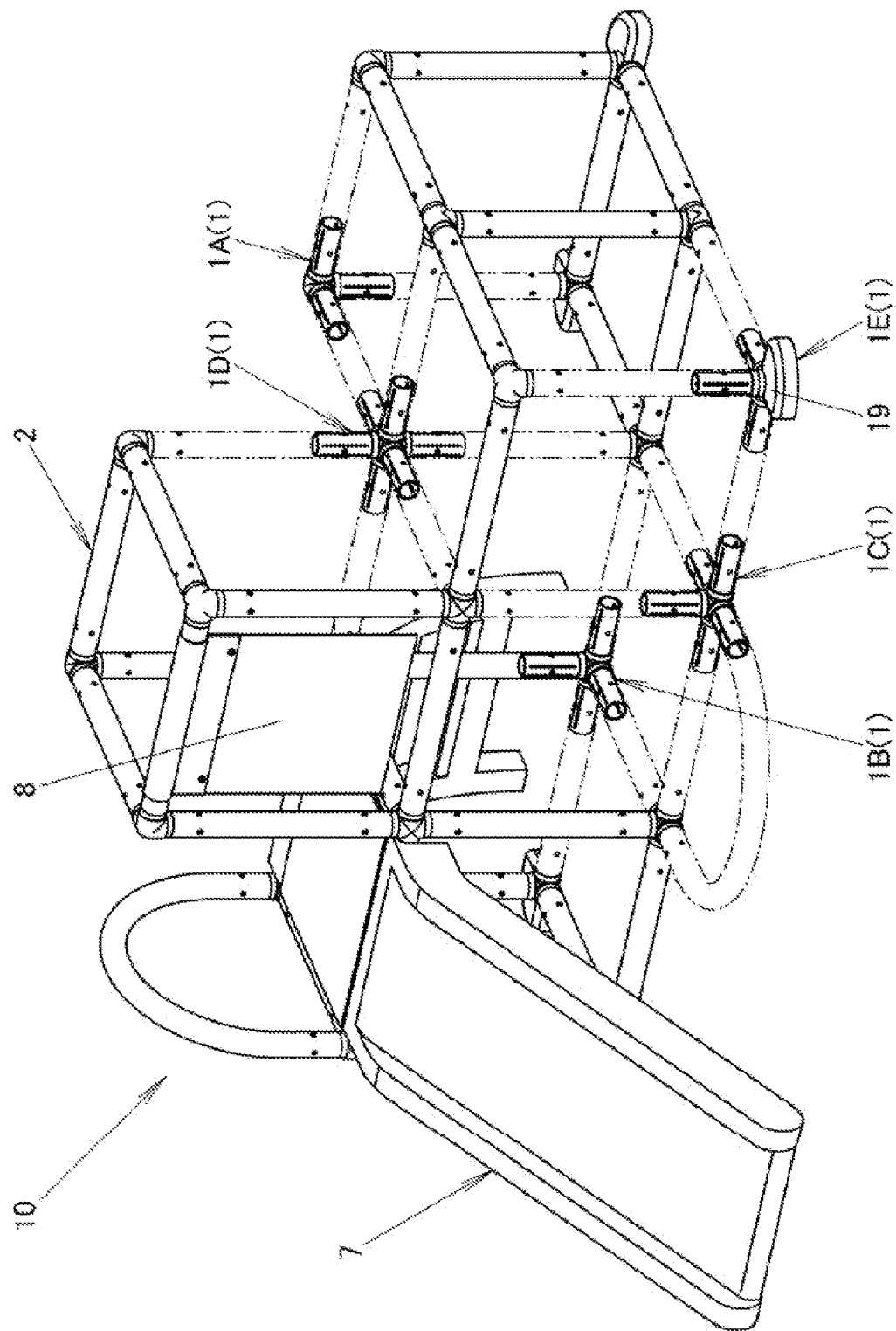
FIG. 1 is an external perspective view of a jungle gym according to an embodiment of the invention.

Hereinafter, a best mode for carrying out the invention will be described by use of the accompanying drawings.

A jungle gym 10 is built up in various shapes by a plurality of tubes 2 being connected together by connectors for a jungle gym 1 in every direction. The plurality of tubes 2 is made of a synthetic resin and is formed as a linear cylinder with a predetermined length. In this plurality of tubes 2, four locking holes 20 are formed in proximity to both ends of the tube 2 so that a locking projection 15 which is provided to the jungle gym connector 1 is fitted thereinto.

Each of the four locking holes 20 are formed to pass through the tube 2 from inside to outside and each of which faces four directions which are at right angle to each other. In addition, the locking holes 20 are disposed in such a manner that the line connecting the center of the locking holes 20 disposed at the one end and the center of the locking holes 20 at the other end of the tube 2 is oriented to be parallel to the center axis of the tube 2. Namely, the tube 2 is attached to the jungle gym connector 1 by the jungle gym connector 1 being inserted into the tube 2, whereby the locking projection 15 of the jungle gym connector 1 locks into the locking hole 20 of the tube 2. Then, by connecting so formed tubes 2 together in every direction, the jungle gym in a well-balanced fashion can be built up.

The jungle gym connector 1 is made of the synthetic resin and the tube 2 is detachably attached to the jungle gym connector 1. The jungle gym connector 1 includes three to six connector arms 12 which protrude from a cylinder portion 18 of a base portion 11 so as to be inserted into the tube 2 and is formed cylindrical in shape. The connector arms 12 are disposed so that center axes of the connector arms 12 intersect each other at right angles. A plurality of types are available in the jungle gym connector 1, these are, a first connector 1A having three connector arms 12 protruding three directions, a second connector 1B having four connector arms 12 protruding four directions, a third connector 1C having five connector arms 12 protruding five directions, a fourth connector 1D having six connector arms 12 protruding six directions, and a fifth connector 1E having three connector arms protruding three directions and including additionally a support portion 19.

In the connector arm 12, two pairs of linear cutout portions both of which are parallel to an axis direction of the connector arm 12 are formed on the each connector arm 12 in such a manner that the pairs of cutout portions 14 face each other. By forming this, a portion between the cutout portions is formed into a flexible portion 13 which can be elastically deformed so as to be deflected inward by pressing force from outside. Namely, each of the flexible portions 13 is connected to the cylindrical connector arm 12 at two portions of a base portion 11 side and a distal side of the connector arm. Substantially a center of the flexible portion 13 is formed so as to be deflected inward by being pressed from outside with the connected portions to the connector arm 12 as fixed ends. A locking projection 15 to be fitted into the locking hole 20 of the tube 2 is formed on an outer surface of the flexible portion 13 substantially at the center thereof.

Therefore, by inserting the connector arm 12 into the tube 2, an interior surface of the tube 2 presses the locking projection of the connector arm 12 to inward to thereby cause the flexible portion 13 to be deformed. In addition, inserting the connector arm 12 into the tube 2 further to thereby cause the locking projection 15 of the connector arm 12 to be fitted into the locking hole 20 of the tube 2, whereby the tube 2 and the jungle gym connector 1 can be connected together.

The locking projection 15 of the jungle gym connector 1 includes an inclined portion 16 which is formed in such a manner that a degree of projection is higher at a base portion 11 side to which a plurality of connector arms 12 are combined and the degree of projection is lower at a distal end side of the each connector arm 12.

The jungle gym 10 comprises a pliers-type removal tool 5 for being used to disassemble the jungle gym connector 1 and the tube 2. The removal tool 5 includes a clamping projection 52 on an inside of a jaws portion 51 at each jaw which is formed so as to be inserted into the locking hole 20 of the tube 2 when the jaws portion 51 of the removal tool 5 is closed.

Accordingly, the jungle gym connector 1 can be removed from the tube 2 by applying the jaws portion 51 of the removal tool 5 to the tube 2 and nipping the tube 2 by the so applied jaws portion 51, whereby the locking projection 15 of the jungle gym connector 1 fitted into the locking hole 20 is pressed inward by means of the clamping projection 52 of the jaws portion 51 to thereby cause the flexible portion 13 of the jungle gym connector 1 to be deformed.

Hereinafter, an embodiment of the invention will be described by reference to the accompanying drawings.

As shown in FIG. 1, a jungle gym 10 is a jungle gym for children which can be built up in various shapes by a plurality of tubes 2 being connected together by a connector for a jungle gym 1 in every direction.

The jungle gym 10 is sold disassembled. A set of the jungle gym 10 consists of a predetermined number of the jungle gym connectors 1, a predetermined number of tubes 2, a pliers-type removal tool for disconnecting the jungle gym connector 1 and the tube 2, and accessories such as a slider 7 in a package.

The plurality of tubes 2 is made of synthetic resin and is formed as a linear cylinder with having uniform dimensions of approximately 300 mm in length and on the order of 32 mm in outside diameter. By making a plurality of tubes 2 in the same length as described, the tube 2 can be disposed to various positions freely in the jungle gym 10, whereby the jungle gym 10 can be built up in any shape as desired. Additionally, the jungle gym 10 also includes the tube 2 formed in a curved circular arc which can be used as a hand rail or the like.

Figure 2:
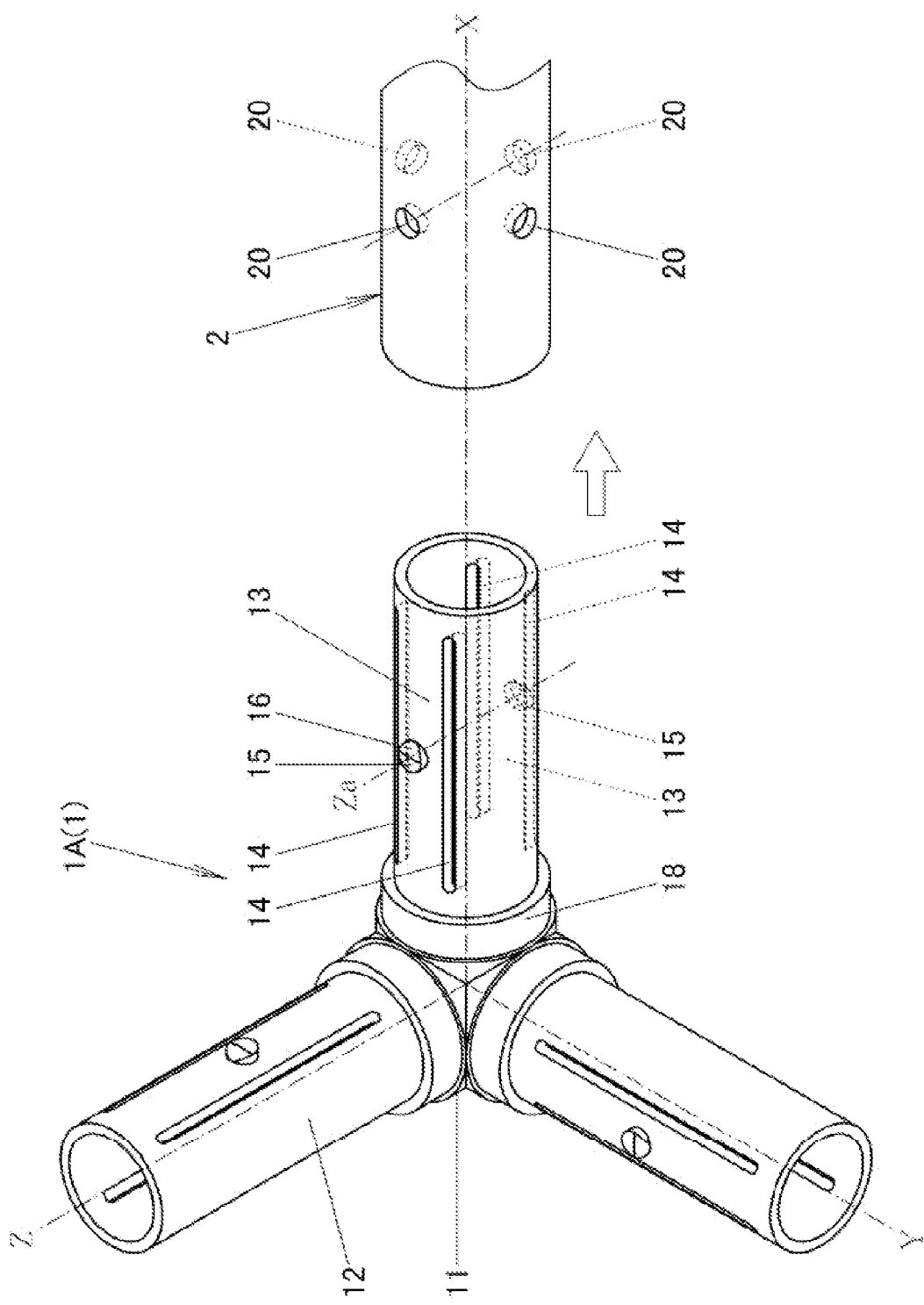
FIG. 2 is an external perspective view of a connector for the jungle gym and a tube according to the embodiment of the invention.

In proximity to each end of the tube 2, as shown in FIG. 2, four locking holes 20 are drilled in positions equally spaced in circumferential direction and the four locking holes 20 is formed so as to be fitted thereinto by the locking projection 51 which is described later. Specifically, the four locking holes 20 are formed perforated through from inside to outside and each of which faces four directions which intersect each other at right angles. Additionally, in the linear tube 2, the locking holes 20 are disposed in such a manner that a line passing across a center of the locking hole 20 disposed at one end of the tube 2 and the center of the locking hole 20 disposed at the other end of the tube 2 is oriented to be parallel to the center axis of the tube 2.

Namely, the tube 2 is installed to the jungle gym connector 1 by the jungle gym connector 1 being inserted into the tube 2, whereby a locking projection 15 of the jungle gym connector 1 is fitted into a locking hole 20 of the tube 2. Then, by connecting so installed tubes 2 in every direction, a well-balanced jungle gym 10 can be built up.

Figure 3:
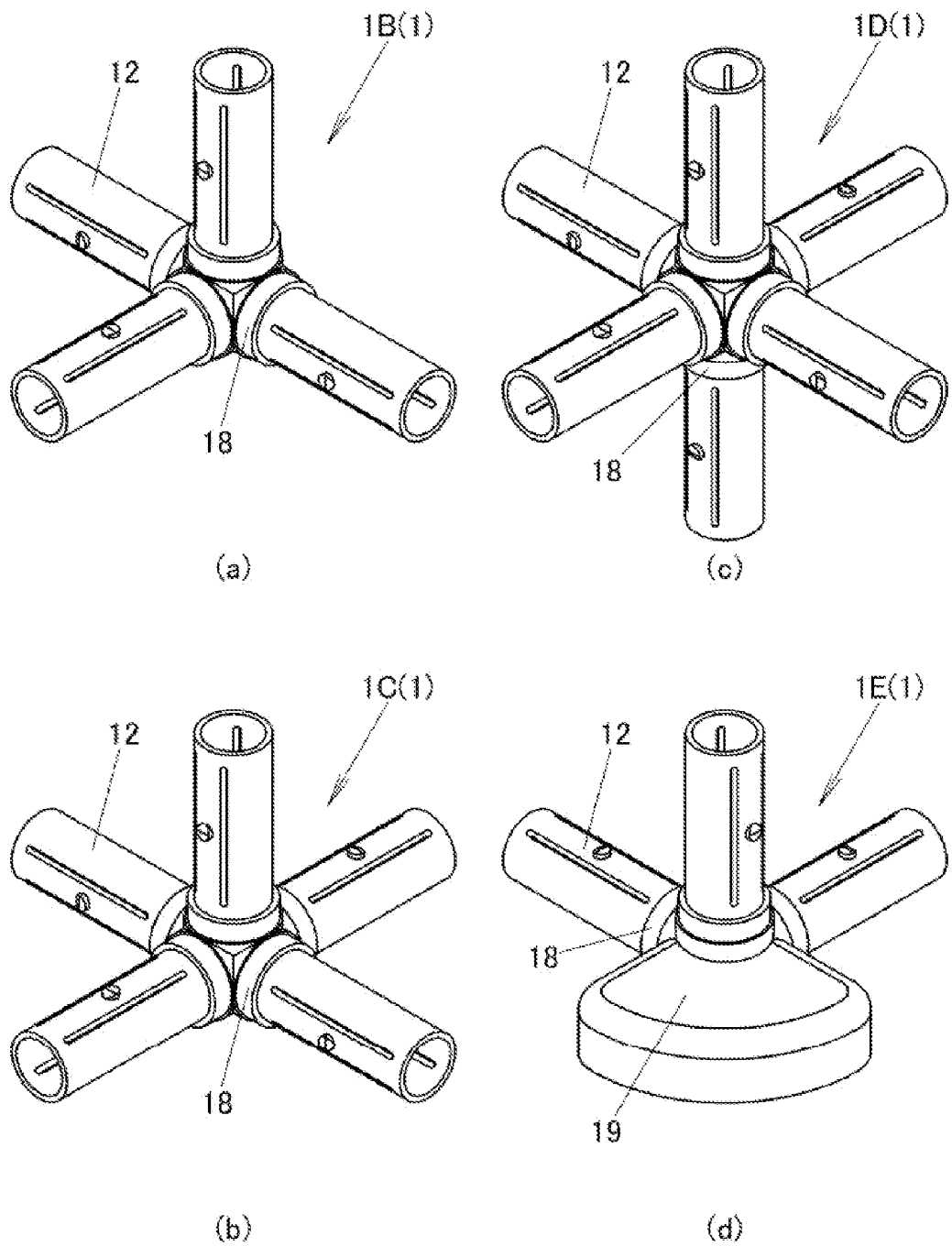
FIG. 3 is an external perspective view of the jungle gym connector according to the embodiment of the invention.

The jungle gym connector 1 is made of synthetic resin such as polypropylene which has properties of relatively light weight, high strength, stiffness, high flexural fatigue strength, and also flexibility. The jungle gym connector 1 is made so that the tube 2 is removably installed thereto. The jungle gym connector 1 includes, as shown in FIGS. 2 and 3, three to six connector arms 12 which protrude from a base portion 11 for being inserted into the tubes 2. Namely, a plurality of the connector arms 12 are each combined together by the base portion 11. The connector arms 12 are formed cylindrical and 40 mm in length, and are disposed so as to intersect each other at right angles. That is, as shown in FIG. 2, the connector arms 12 are disposed in such a manner that a center axis of the each connector arm 12 coincides with one of axes, a X-axis, a Y-axis, or a Z-axis which are three different directions intersecting each other at right angles.

The connector arm 12 is held by cylindrical portions 18 which are installed to the base portion 11 in a standing manner for being oriented to each of the three directions. An outside diameter of the connector arm 12 is formed approximately 27 mm which is smaller than an outside diameter of the cylindrical portion 18 which is approximately 32 mm, whereby a bump is formed at a boundary between the cylindrical portion 18 and the connector arm 12. The outside diameter of the connector arm 12 is formed on the order of 0.2 mm smaller than an inside diameter of the tube 2. Namely, since the connector arm 12 is formed in a size to be inserted movably into the tube 2, a difficulty in installing and removing the tube 2 to/from the jungle gym 1 caused by friction force therebetween can be eliminated.

The jungle gym connector 1 consists of a plurality of types. These are, as shown in FIGS. 1 to 3, a first connector 1A having three connector arms 12 protruding three different directions (see FIG. 2), a second connector 1B having four connector arms 12 protruding four different directions (see FIG. 3 (*a*)), a third connector 1C having five connector arms 12 protruding five different directions (see FIG. 3 (*b*)), a fourth connector 1D having six connector arms 12 protruding six different directions (see FIG. 3 (*c*)), and a fifth connector 1E having three connector arms protruding three different directions and including additionally a support portion 19 (see FIG. 3 (*d*)).

Namely, the first connector 1A and the fifth connector 1E include three connector arms 12 which are disposed in three directions so as to intersect each other at right angles, the second connector 1B includes four connector arms 12 which are disposed in four directions so as to intersect each other at right angles, the third connector 1C includes five connector arms 12 which are disposed in five directions so as to intersect each other at right angles, and the fourth connector 1D includes six connector arms 12 which are disposed in six directions so as to intersect each other at right angles.

As shown in FIG. 1, the fifth connector 1E having the support portion 19 can provide the jungle gym 10 with a higher stability by assembling the jungle gym 10 in such a manner that the connector 1E is disposed at a bottom of the jungle gym 10 at every corner of intersection so that the support portion 19 is oriented outward. The use of the fifth connector 1E in such a way is beneficial especially when the built up jungle gym 10 includes only a small number of rows, that is, one row or two rows, of cubes formed by the tubes 2 in depth or width direction.

In the connector arm 12, two pairs of linear cutout portions both of which are parallel to an axis direction of the connector arm 12 are formed on the each connector arm 12 in such a manner that the two pairs of cutout portions 14 face each other. By forming this, a portion between the cutout portions of the pair of cutout portions 14 has an elastic deformation property which is configured to deflect inward by pressing force from outside and is referred to as a flexible portion 13. Namely, each of the flexible portions 13 is connected to the cylindrical connector arm 12 at two portions, one is a base portion 11 side and the other is a distal side of the connector arm. By being so formed, substantially a center of the flexible portion 13 is pressed from outside to thereby deflect inward with the connected portions to the connector arm 12 as fixed ends.

A column-shaped locking projection 15 for being inserted to be fitted into the locking hole 20 of the tube 2 is formed on an outer surface of the flexible portion 13 at substantially the center thereof in such a manner as to project outward from the connector arm 12. A distal end side of the locking projection 15 is referred to as an inclined portion 16. This inclined portion 16 of the locking projection 15 is formed such that a degree of projection to outward increases higher from the distal end side of the connector arm 12 to a base portion 11 side of the connector arm 12 gradually.

The flexible portion 13 is formed with a predetermined width, length, and thickness to thereby permit an elastic deformation of the flexible portion 13, whereby a distal end of the locking projection 15 can be fitted into an inside of the tube 2. By the design as described, when the connector arm 12 is inserted into the tube 2, the flexible portion 13 is deformed by the locking projection 15 being pressed by an inner peripheral surface of the tube 2. Since the elastically deformed flexible portion 13 returns to its original shape by elastic force of itself when the locking projection 15 is positioned to coincide with the locking hole 20, the locking projection 15 fits into the locking hole 20, whereby the tube 2 and the connector arm 12 are locked together. Note that the flexible portion 13 is not limited to be the same thickness as the connector arm 12, but may be formed thinner than the connector arm 12.

The two flexible portions 13 are each provided in the symmetrical positions with respect to a center axis of the cylindrical connector arm 12. In addition, the two flexible portions 13 so provided are formed in such a manner that a center axis of the locking projections 15 is disposed to be parallel to a center axis of the other connector arm 12 of the same jungle gym connector 1 which intersects with the center axis of the connector arm 12 and is disposed to intersect with the center axis of the connector arm 12 on which the two locking projections 15 are provided. Specifically, as shown in FIG. 2, the locking projections 15 of the connector arm 12 which is disposed to coincide with a X-axis are formed such that the center axis of the locking projections 15 (that is, an axis line passing through the two flexible portions 13 disposed symmetrically) is disposed to be parallel to a Z-axis direction which is a center axis direction of the other connector arm 12 which intersects with the connector arm 12, and yet the center axis of the locking projections 15 is disposed to coincide with a Za-axis which intersects with the X-axis which is a center axis of the connector arm 12. Note that the locking projections 15 may be formed such that the center axis of the locking projections 15 is disposed on an axis which is parallel to a Y-axis direction.

In proximity to both ends of the tube 2, four locking holes 20 are disposed in positions equally spaced in circumferential direction in such a manner that lines passing through the locking holes 20 on both ends of the tube 2 are arranged to be parallel to the center axis of the tube 2. With the components so formed, the jungle gym 10 can be built up in a desired and a well-balanced form, without concerning a position or a direction of the jungle gym connector 1, by attachment the two locking projections 15 provided to the connector arm 12 into the two locking holes 20 out of the four locking holes 20, whereby the tubes 2 are connected in every direction via the jungle gym connectors 1. Note that the number of the locking projection 15 provided to each connector arm is not limited to two but four locking projections 15 may also be provided with the four flexible portions 13 to correspond to the four locking holes 20 of the tube 2. On the other hand, only one locking projection 15 with one flexible portion 13 may also be provided to the connector arm 12.

Figure 4:
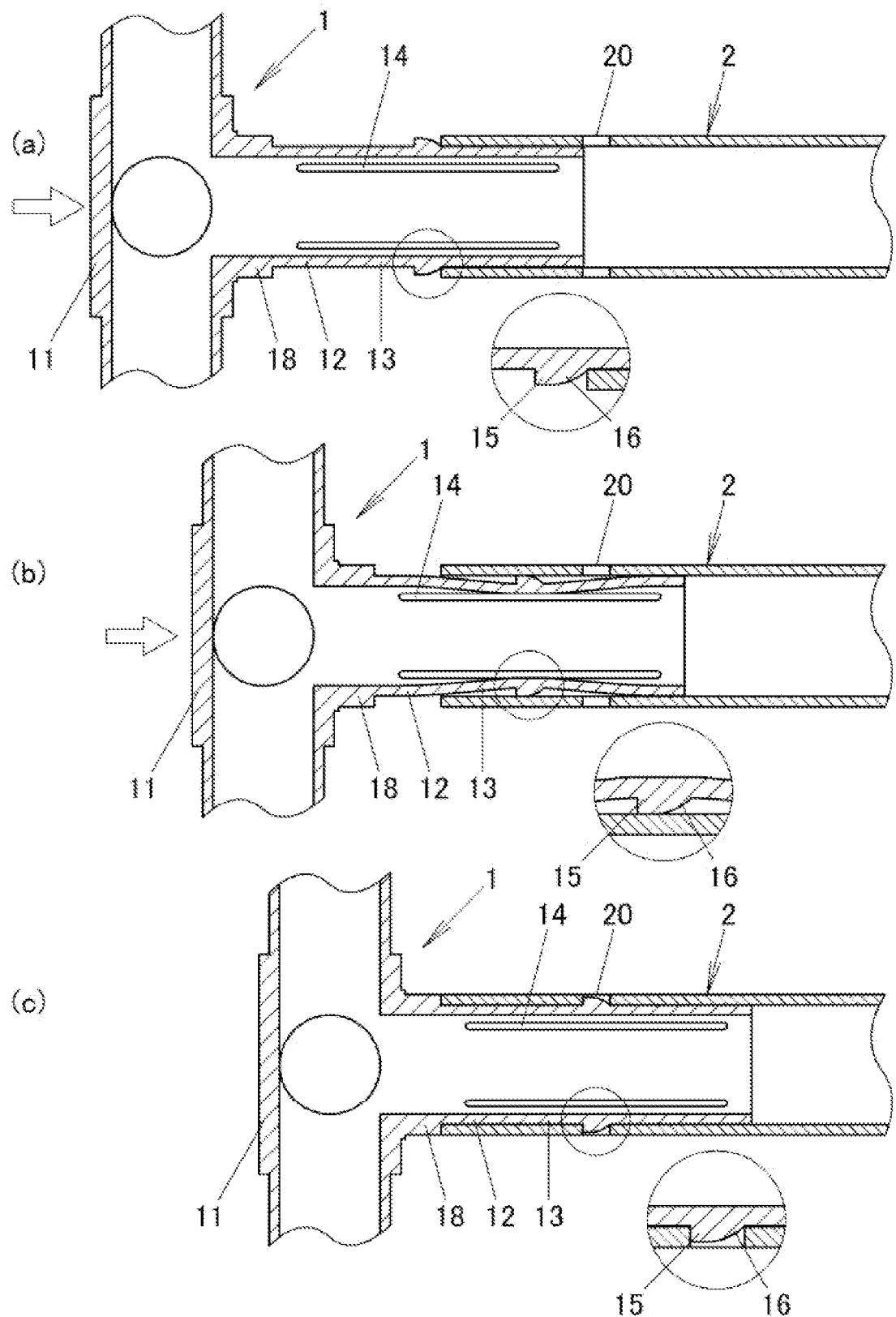
FIG. 4 is an exemplary view which shows an installation operation between the jungle gym connector and the tube according to the embodiment of the invention.

Consequently, with the connector arm 12 being inserted into the tube 2 and the locking projection being engaged with an end face of the tube 2, as shown in FIG. 4 (a), by applying predetermined force to the so assembled components, as shown in FIG. 4 (b), the locking projection 15 of the connector arm 12 is pressed by the inner surface of the tube 2 inward, whereby the flexible portion 13 deflects, the connector arm 12 can be inserted further into the tube 2. In addition, as shown in FIG. 4 (c), inserting the connector arm 12 furthermore into the tube 2 causes the locking projection 15 and the locking hole 20 to fit together, whereby the tube 2 and the jungle gym connector are connected together.

As described heretofore, since the flexible portion 13 is configured to be elastically deformable to deflect inward, a player can insert the connector arm 12 into the tube 2 smoothly to connect the jungle gym connector 1 and the tube 2 together, whereby the plurality of tube 2 can be connected in every direction by use of the jungle gym connector 1. In addition, since the locking projection 15 is provided with the inclined portion 16 which is formed in such a manner that the degree of projection is higher at the base portion 11 side and the degree of projection is lower at the distal end side of the connector arm 12, the player can connect the jungle gym connector 1 and the tube 2 together more easily.

Note that the end portion of the tube 2 may be provided with the inclined portion formed by a chamfered inner edge so as to make the inside diameter of the tube larger at the end portion.

The locking projection 15 and the locking hole 20 constitute a attachment portion of the jungle gym connector 1 and the tube 2 and are provided at a predetermined position in such a manner that end faces of the base portion 11 of the jungle gym connector 1 and the tube 2 contact each other when the jungle gym connector 1 and the tube 2 are connected. Namely, the tube 2 is formed such that the end face of the tube 2 engages to be stopped to the base portion 11 simultaneously when the locking projection 15 and the locking hole 20 are locked together for preventing the tube 2 from being moved further to the base portion 11 side. By forming as described above, in the event that the tube 2 is further pressed to the base portion 11 side, the tube 2 does not press the inclined portion 16 inward again for moving to the base portion 11 side. In addition, by providing the locking projection 15 and the locking hole 20 as described, the jungle gym connector 1 and the tube 2 so connected are fixed in a predetermined position and a backlash therebetween can be eliminated.

Note that the flexible portion 13 can also be formed a tongue-piece shape by one end of the pair of cutout portions being linked together. However, as shown in FIG. 4, the flexible portion 13 in the present invention is formed as a strip-shaped portion whose both ends are fixed with having the linear cutout portions 14 which are parallel to the connector arm 12 to thereby be permitted to be elastically deformed by the pressing force from outside. More specifically, by forming the flexible portion 13 in such a manner that the flexible portion 13 is deformed with the both ends thereof (the distal end side and the base portion 11 side of the connector arm 12) are fixed for inserting the connector arm 12 into the tube 2 and that the flexible portion 13 can return to its original shape when the locking projection 15 and the locking hole 20 are locked together, the connector arm 12 and the tube 2 can be connected together more solidly and in a secured fashion relative to the tongue-piece shaped flexible portion 13.

In addition, the flexible portion 13 formed by two linear cutout portions 14 is connected to the connector arm 12 at its both ends, whereby an weakened resilience will rarely be caused through repeated attachment and releasing with the tube 2. With the so formed flexible portion 13, the jungle gym connector 1 having an excellent durability can be attained.

Additionally, as shown in FIG. 4 (a), the jungle gym connector 1 and the tube 2 are configured such that the jungle gym connector 1 can be inserted into the tube 2 with the flexible portion 13 being deformed by applying predetermined force to the both components which are assembled in a state that the locking projection 15 engages with the end face of the tube 2. Thanks to this configuration, little children can not be able to insert the jungle gym connector 1 into the tube 2, and hence, accidents, for instance, a child is nipped or pinched his/her hand or finger(s) by the end faces of the base portion 11 and the tube 2, can be prevented.

Figure 5:
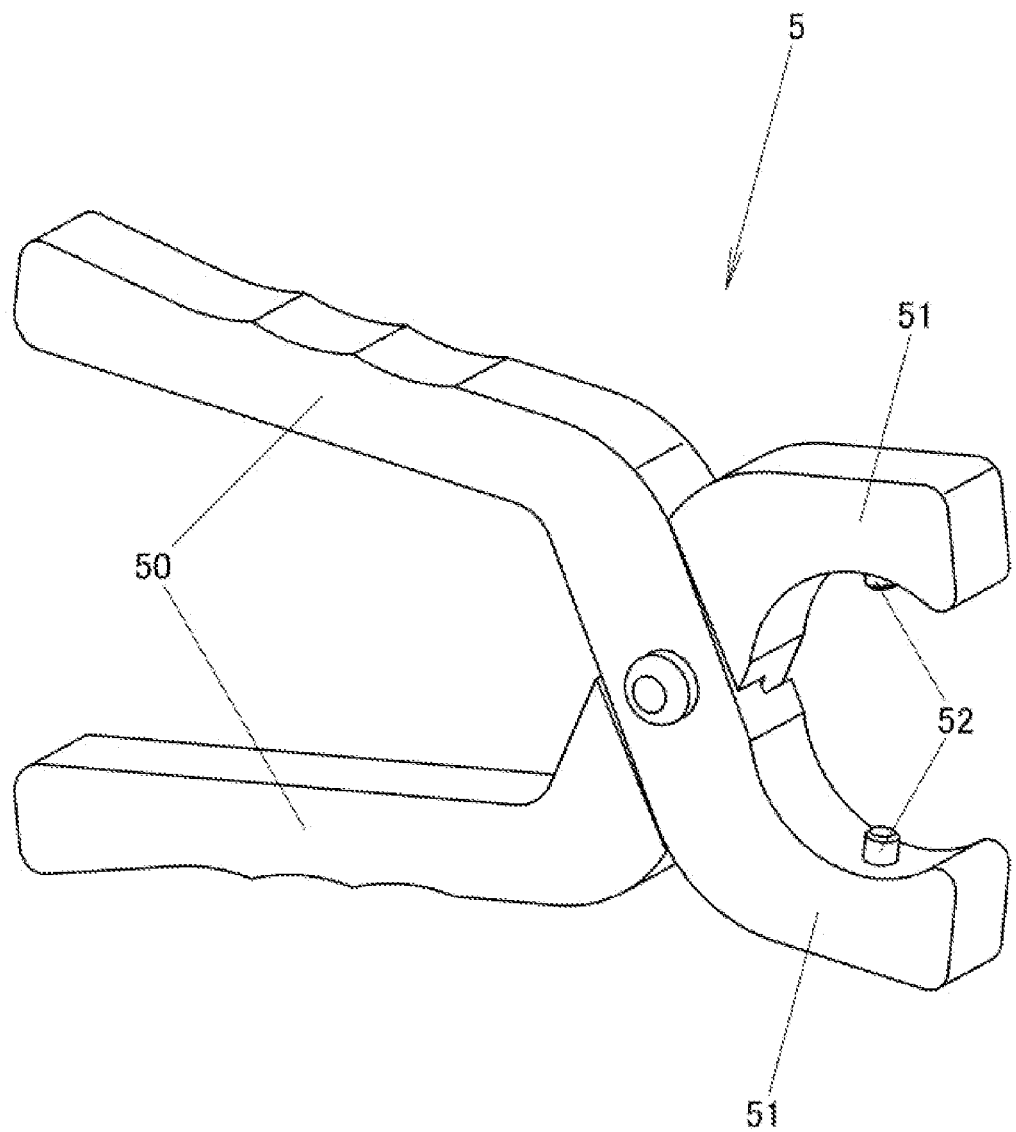
FIG. 5 is an external perspective view of a removal tool according to the embodiment of the invention.

Further, as shown in FIG. 5, the jungle gym 10 includes a removal tool 5 which is used for disconnecting the jungle gym connector 1 and the tube 2. This removal tool 5 is a pliers-type removal tool 5 having handles 50 for being gripped by a hand and a jaws portion 51 for nipping the tube 2. The removal tool 5 includes a clamping projection 52 on an inside of a jaws portion 51 at each jaw which is formed so as to be inserted into the locking hole 20 of the tube 2 when the jaws portion 51 of the removal tool 5 is closed.

Figure 6:
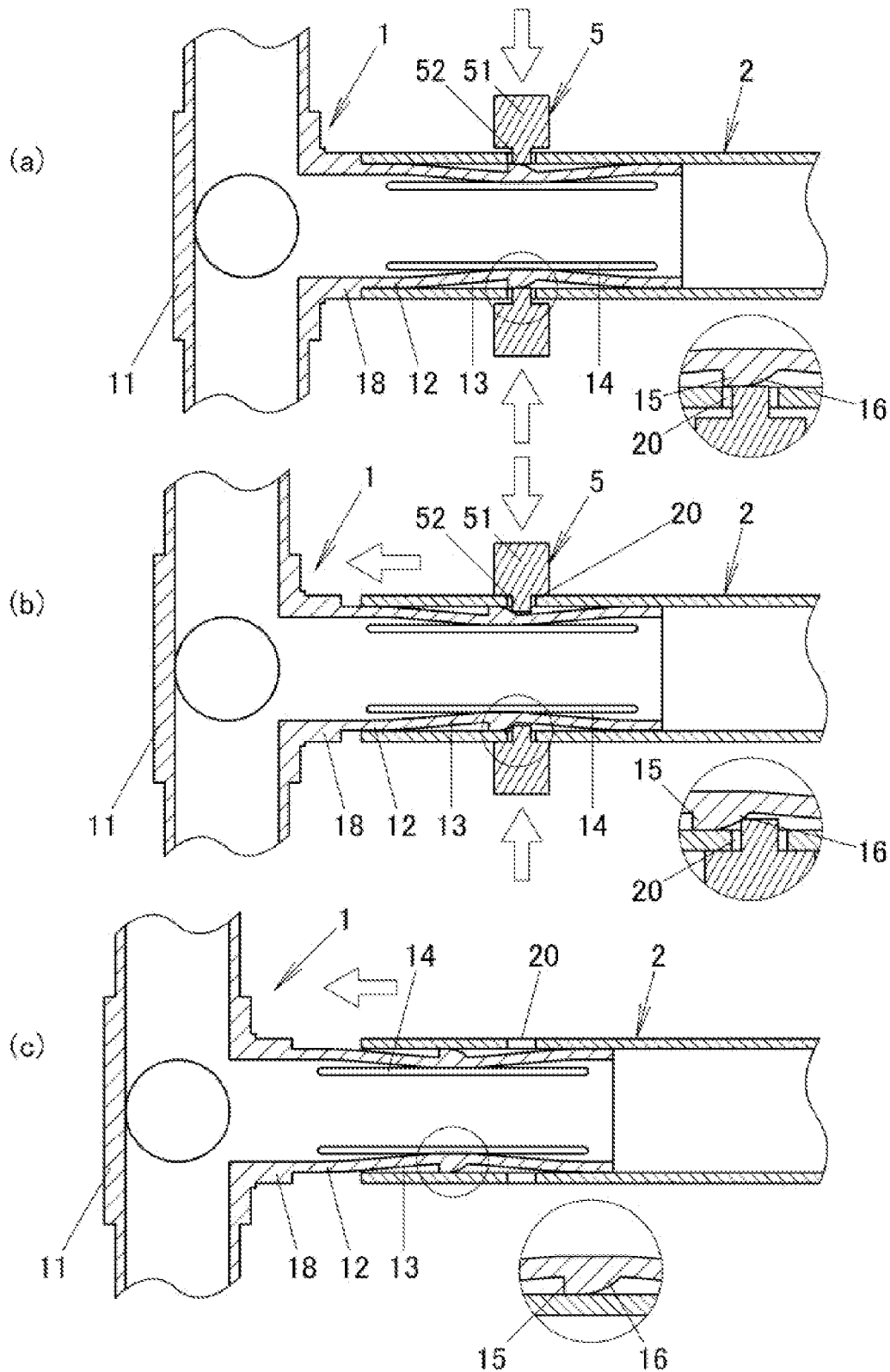
FIG. 6 is an exemplary view which shows a removal operation between the jungle gym connector and the tube according to the embodiment of the invention.

Therefore, as shown in FIG. 6 (a), with operating the removal tool 5 by applying the jaws portion 51 to the tube 2 and closing the jaws portion 51, the clamping projection 52 of the jaws potion 51 presses inward the locking projection 15 of the jungle gym connector 1 which is fitted into the locking hole 20, whereby the flexible portion 13 of the jungle gym connector 1 can be deflected.

Next, as shown in FIG. 6 (b), closing the jaws portion 51 further with a state that the clamping projection 52 and the locking projection 15 of the connector arm 12 are engaged, since the inclined portion 16 of the locking projection 15 of the connector arm 12 is pressed by the clamping projection 52, the jungle gym connector 1 moves in response to the closing operation of the jaws portion 51. As a result, the locking projection 15 does not push back the jaws portion 51, whereby, as shown in FIG. 6 (c), the jungle gym connector 1 can be removed from the tube 2 with ease.

For the disconnection of the jungle gym connector 1 and the tube 2, the form of the removal tool is not limited to the pliers-type removal tool 5 as shown, but a rod-shaped member or the like for pressing the locking projection 15 from outside can also be utilized. Namely, by disconnecting the locked state of the locking projection 15 and the locking hole 20, only the locking projection 15 contacts with the inner peripheral surface of the tube 2, whereby the jungle gym connector 1 and the tube 2 can be disconnected with small force.

As described heretofore, forming the elastically deformable flexible portion 13 by providing a pair of cutout portions 14 and providing the locking projection 15 to substantially a center of the flexible portion 13 for being fitted into the locking hole 20 of the tube 2 facilitate the installation and the removal of the jungle gym connector 1 and the tube 2. In addition, with the components so configured, there can be provided the jungle gym connector 1 for permitting a strong connection and the jungle gym 10 constructed by the tubes 2 connected together by the jungle gym connector 1 having superior safety.

The jungle gym 10 can be disassembled with ease by the use of the pliers-type removal tool 5 having a clamping projection 52 on an inside of a jaws portion 51 at each jaw which is formed so as to be inserted into the locking hole 20 of the tube 2 when the jaws portion 51 of the removal tool 5 is closed.

Since the configuration of the jungle gym 10 is simple, a production cost can be reduced, whereby the jungle gym 10 can be provided at a low price.

The jungle gym 10 in a predetermined shape can be built up by including a jungle gym connector 1 having three to five connector arms 12. Additionally, the jungle gym 10 which is more complicated in construction and bigger in size can be built up by including a jungle gym connector 1 having six connector arms 12.

By providing the two flexible portions 13 on the each connector arm 12, and arranging the two flexible portions 13 so as to be disposed in the symmetrical positions with respect to the center axis of the cylindrical connector arm 12, the jungle gym connector 1 can be fitted to the tube 2 with ease while not making a biased load, and can be connected more securely.

In addition, by forming the tubes 2 and the jungle gym connector 1 of synthetic resin, the jungle gym 10 which is light weight, easy to handle, and inexpensive can be provided. The jungle gym connector 1 is made of synthetic resin such as polypropylene which has a high flexural fatigue strength property so that the jungle gym 10 can be built up and disassembled many times through repeated installation and removal of the jungle gym connector 1 and the tube 2.

Furthermore, the jungle gym 10 is designed such that a slider 7, shown in FIG. 1, a swing and a riding toy or the like, not shown, can be attached thereto, whereby the jungle gym 10 is not limited to be played as a jungle gym, but can also be played in a different way. Additionally, as shown in FIG. 1, a dangling object 8 on which characters popular among children or the like are printed can also be attached to the jungle gym 10. The dangling object 8 is made of a flexible vinyl sheet or a resin plate and includes an attaching portion at its upper end into which the tube 2 passes therethrough. Consequently, the jungle gym 10 can be decorated with the dangling object 8 at any desired position for fun while being built up.

The invention is not limited to the embodiment that has been described heretofore but can be modified or improved variously without departing from the spirit and scope of the invention.

I claim:

1. A connector for a jungle gym that is used in the jungle gym which is configured by a plurality of tubes being connected together for connecting the tubes mutually, wherein
at least three cylindrical connector arms are provided thereto which protrude from a base portion for being inserted into the tubes,
each of the connector arms are disposed so as to intersect each other at right angles, includes
at least one pair of linear cutout portions which are parallel to an axis direction of the each connector arm and not joined by a cutout,
a portion referred to as a flexible portion which is the portion in between the pair of linear cutout portions being elastically deformable to deflect by pressing force and the flexible portion is connected to the cylindrical connector arm at two portions, one is a base portion and the other is a distal side of the connector arm, and
a locking projection formed at substantially a center of the flexible portion for being inserted into a locking hole in the tube.

2. A jungle gym which is made up of a plurality of tubes all formed to a predetermined length, a connector to which the tubes are removably installed, and a pliers-type removal tool, wherein
the connector includes at least three cylindrical connector arms which protrude from a base portion for being inserted into the tube,
each of the connector arms are disposed so as to intersect each other at right angles and includes
at least one pair of linear cutout portions which are parallel to an axis direction of the each connector arm and not joined by a cutout,
a portion referred to as a flexible portion which is the portion in between the pair of linear cutout portions being elastically deformable to deflect by pressing force and the flexible portion is connected to the cylindrical connector arm at two portions, one is a base portion and the other is a distal side of the connector arm, and
a locking projection formed at substantially a center of the flexible portion for being inserted into a locking hole in the tube, and
the removal tool includes a clamping projection on an inside of a jaws portion at each jaw which is formed so as to be inserted into the locking hole in the tube when the jaws portion of the removal tool is closed.

3. A jungle gym which is made up of a plurality of tubes and a plurality of connectors for a jungle gym, wherein
the plurality of tubes include a plurality of linear cylindrical tubes formed with the same length,
the each tube includes four locking holes in proximity to both ends of the tube,
the four locking holes provided in proximity to both ends of the tube are formed perforated through from inside to outside each of which faces four directions which intersect each other at right angles and are disposed in such a manner that a line passing through a center of the two locking holes disposed at the opposite ends of the tube is oriented to be parallel to the center axis of the tube,
each of the connectors for the jungle gym includes a plurality of cylindrical connector arms whose center axes are disposed so as to be oriented three different directions which intersect each other at right angles,
each of the connector arms of the connector for the jungle gym is formed cylindrical shape and an outside diameter thereof is formed to be inserted into the tube, includes at least one flexible portion formed elastically deformable between two linear cutout portions which are parallel to an axis direction of the connector arm and not joined by a cutout, and the flexible portion is connected to the cylindrical connector arms at two portions, one is a base portion and the other is a distal side of the connector arm and has a locking projection at substantially a center thereof which projects outward from a surface of the connector arm for being inserted into the locking hole in the tube.

4. The jungle gym according to claim 3, wherein
two of said at least one flexible portion are formed on each of the connector arm and are disposed in asymmetrical positions with respect to a center axis of the cylindrical connector arm, and a line passing through the two flexible portions is oriented to be parallel to a center axis of other connector arm of the connector for the jungle gym.

5. The jungle gym according to claim 3, wherein
the locking projection of the connector for the jungle gym includes an inclined portion at a distal end which is formed in such a manner that a degree of projection is higher at a base portion side to which a plurality of the connector arms are combined and the degree of projection is lower at a distal end side of the each connector arm.

6. The jungle gym according to claim 4, wherein
the locking projection of the connector for the jungle gym includes an inclined portion at a distal end which is formed in such a manner that a degree of projection is higher at a base portion side to which a plurality of the connector arms are combined and the degree of projection is lower at a distal end side of the each connector arm.

7. The jungle gym according to claim 3, wherein
the connector for the jungle gym comprises a plurality of connectors for the jungle gym having three connector arms which are disposed so as to intersect each other at right angles, a plurality of connectors for the jungle gym having four connector arms which are disposed so as to intersect each other at right angles, and a plurality of connectors for the jungle gym having five connector arms which are disposed so as to intersect each other at right angles.

8. The jungle gym according to claim 4, wherein
the connector for the jungle gym comprises a plurality of connectors for the jungle gym having three connector arms which are disposed so as to intersect each other at right angles, a plurality of connectors for the jungle gym having four connector arms which are disposed so as to intersect each other at right angles, and a plurality of connectors for the jungle gym having five connector arms which are disposed so as to intersect each other at right angles.

9. The jungle gym according to claim 5, wherein
the connector for the jungle gym comprises a plurality of connectors for the jungle gym having three connector arms which are disposed so as to intersect each other at right angles, a plurality of connectors for the jungle gym having four connector arms which are disposed so as to intersect each other at right angles, and a plurality of connectors for the jungle gym having five connector arms which are disposed so as to intersect each other at right angles.

10. The jungle gym according to claim 6, wherein
the connector for the jungle gym comprises a plurality of connectors for the jungle gym having three connector arms which are disposed so as to intersect each other at right angles, a plurality of connectors for the jungle gym having four connector arms which are disposed so as to intersect each other at right angles, and a plurality of connectors for the jungle gym having five connector arms which are disposed so as to intersect each other at right angles.

11. The jungle gym according to claim 7, wherein
a plurality of connectors for the jungle gym is further included which includes six connector arms being disposed so as to intersect each other at right angles as the connector for the jungle gym.

12. The jungle gym according to claim 8, wherein
a plurality of connectors for the jungle gym is further included which includes six connector arms being disposed so as to intersect each other at right angles as the connector for the jungle gym.

13. The jungle gym according to claim 9, wherein
a plurality of connectors for the jungle gym is further included which includes six connector arms being disposed so as to intersect each other at right angles as the connector for the jungle gym.

14. The jungle gym according to claim 10, wherein
a plurality of connectors for the jungle gym is further included which includes six connector arms being disposed so as to intersect each other at right angles as the connector for the jungle gym.

15. The jungle gym according to claim 3, wherein
the tube and the connector for the jungle gym are made of synthetic resin.

16. The jungle gym according to claim 4, wherein
the tube and the connector for the jungle gym are made of synthetic resin.

17. The jungle gym according to claim 6, wherein
the tube and the connector for the jungle gym are made of synthetic resin.

18. The jungle gym according to claim 8, wherein
the tube and the connector for the jungle gym are made of synthetic resin.

19. The jungle gym according to claim 10, wherein
the tube and the connector for the jungle gym are made of synthetic resin.

20. The jungle gym according to claim 12, wherein
the tube and the connector for the jungle gym are made of synthetic resin.

21. The jungle gym according to claim 14, wherein
the tube and the connector for the jungle gym are made of synthetic resin.

* * * * *